(12) United States Patent
Coulombe

(10) Patent No.: US 6,883,615 B2
(45) Date of Patent: Apr. 26, 2005

(54) GRIPPING DEVICE AND METHOD FOR PROTECTING THE HOOF OF A HORSE FROM CONCUSSIVE FORCES

(76) Inventor: Robert W. Coulombe, 1377 Ridge Road N., Ridgeway, Ontario (CA), L0S 1N0

( * ) Notice: Subject to any disclaimer, the term of this patent is extended or adjusted under 35 U.S.C. 154(b) by 0 days.

(21) Appl. No.: 10/649,219

(22) Filed: Aug. 26, 2003

(65) Prior Publication Data

US 2004/0035593 A1 Feb. 26, 2004

Related U.S. Application Data

(63) Continuation-in-part of application No. 10/052,938, filed on Jan. 23, 2002, now Pat. No. 6,619,403.

(51) Int. Cl.$^7$ .................................................. A01L 7/02
(52) U.S. Cl. ........................................................ 168/14
(58) Field of Search ..................................... 168/14, 28

(56) References Cited

U.S. PATENT DOCUMENTS

| | | | | |
|---|---|---|---|---|
| 503,848 A | * | 8/1893 | Hallanan ........................ | 168/4 |
| 684,416 A | * | 10/1901 | Downey ....................... | 168/14 |
| 698,904 A | * | 4/1902 | Christopher ................. | 168/28 |
| 777,022 A | * | 12/1904 | Howell ......................... | 168/14 |
| 825,437 A | * | 7/1906 | White .......................... | 168/14 |
| 909,287 A | * | 1/1909 | Dillon .......................... | 168/14 |
| 989,469 A | * | 4/1911 | Zeller ........................... | 168/28 |
| 1,212,266 A | * | 1/1917 | Schrader et al. ............... | 168/4 |
| 1,516,508 A | * | 11/1924 | Smith ........................... | 168/14 |
| 4,207,947 A | * | 6/1980 | Cope et al. .................... | 168/29 |
| 5,699,861 A | * | 12/1997 | Sigafoos ....................... | 168/17 |

\* cited by examiner

*Primary Examiner*—Robert P. Swiatek
(74) *Attorney, Agent, or Firm*—The Weintraub Group, P.L.C.

(57) ABSTRACT

A gripping device for a horse's hoof to spread shock and concussive forces evenly through the device, distribute pressure over the entire surface of the hoof, provide improved traction with the surface on which the hoof contacts, and enhance therapeutic shoeing applications. The gripping device comprises an elastomeric or polymeric material integrally molded to a gripping plate, the gripping plate including a raised traction section that extends above the elastomer and may form a traction chamber. The gripping device may be used with a removable cushion plate that is fittable within the traction chamber and/or in conjunction with a removable hospital plate that overlies and permits access to an injury to the hoof, include one or more clips for engagement with the front or side of the hoof, the clip(s) being integrally formed with the gripping plate or the elastomer, and include arcuate stiffening ribs and a toe calk.

45 Claims, 7 Drawing Sheets

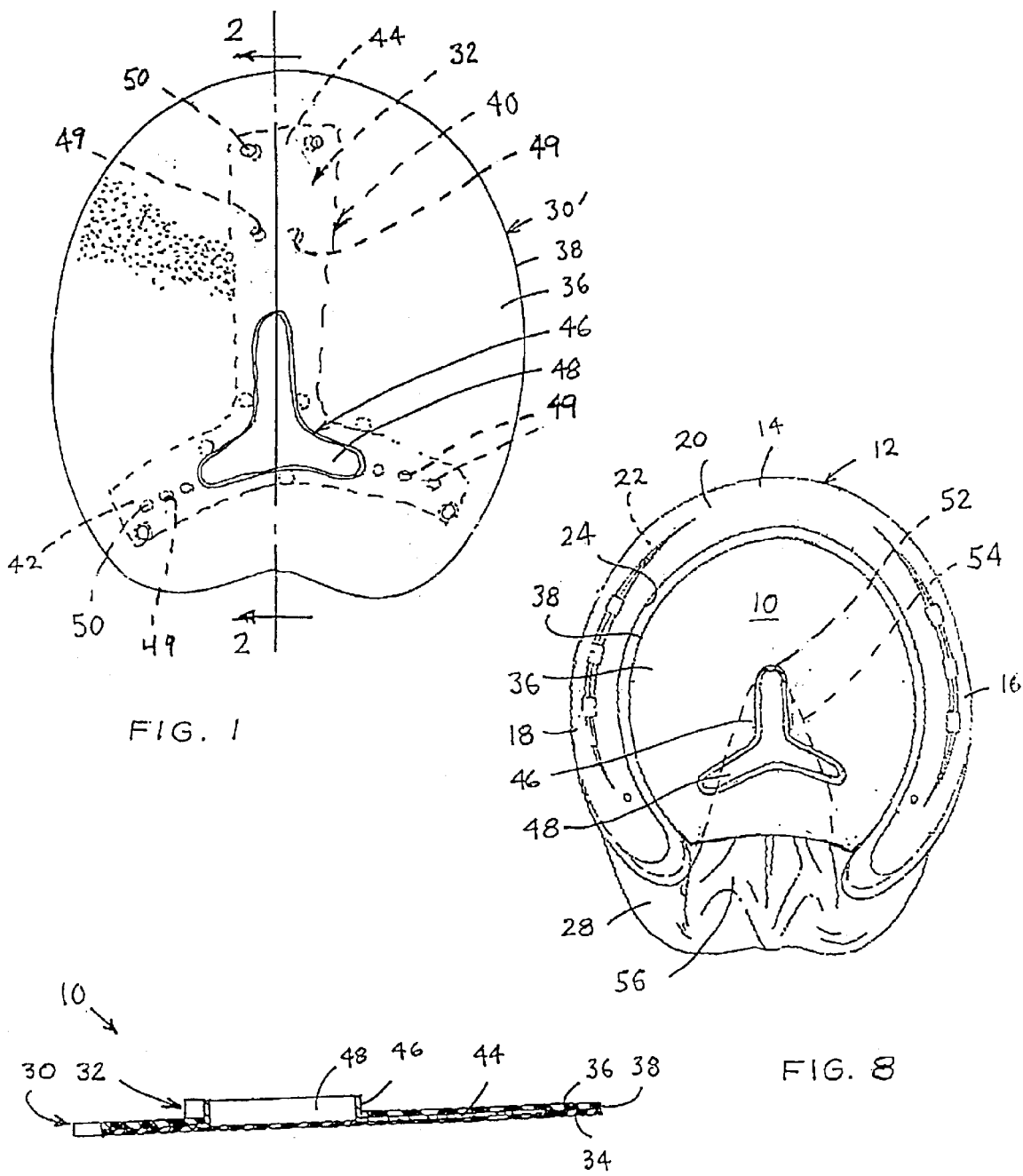

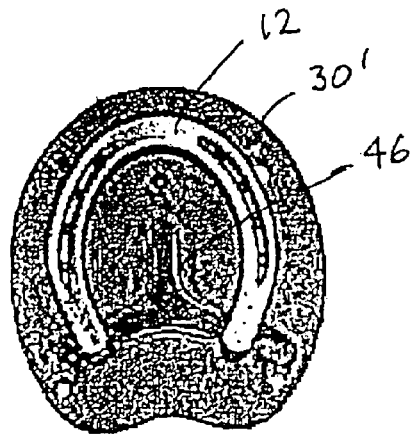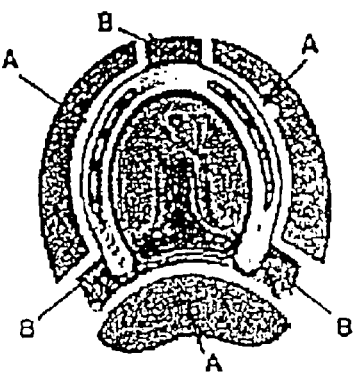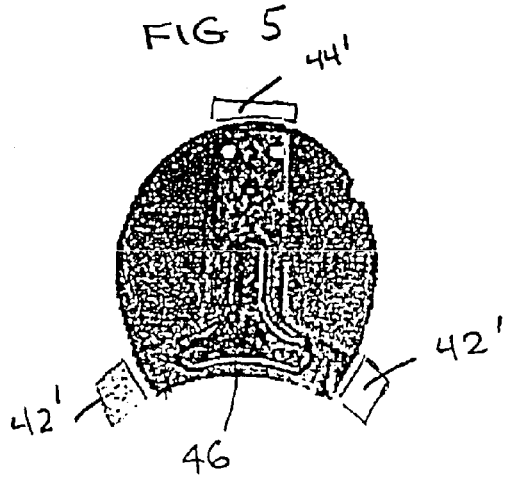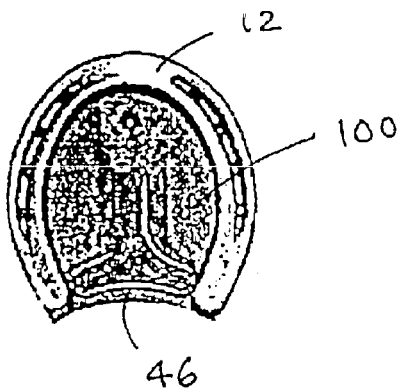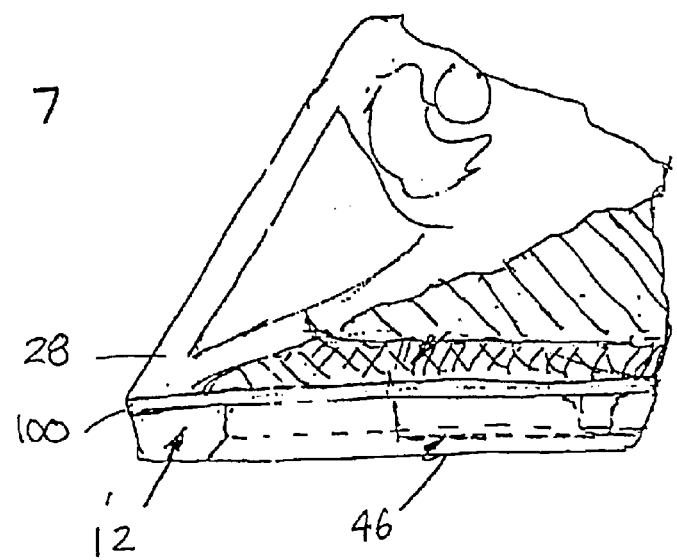

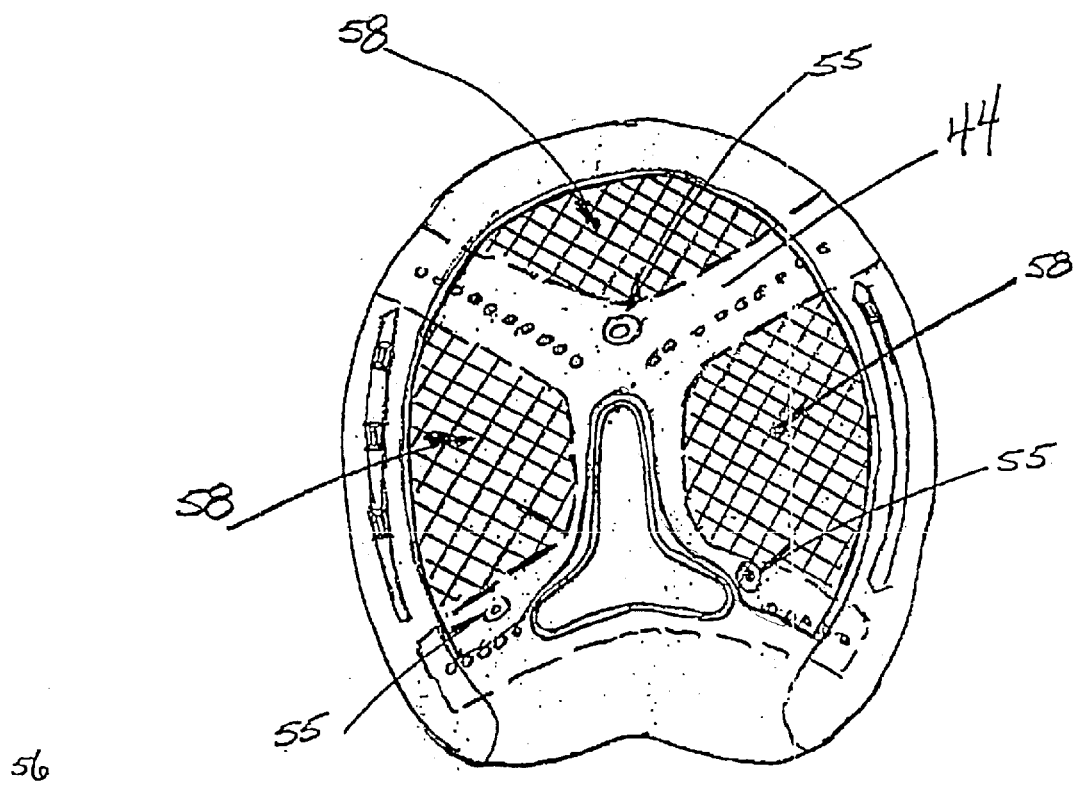
FIG. 9A
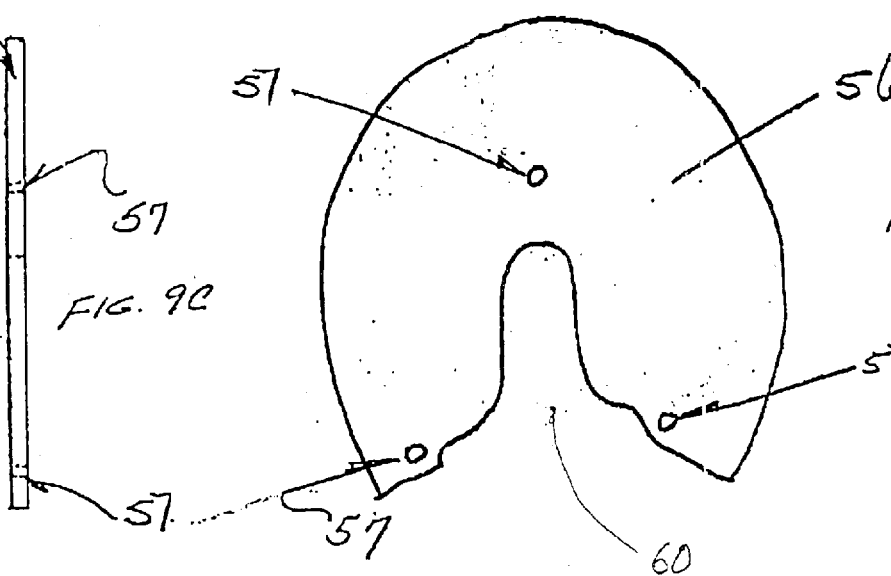
FIG. 9C
FIG. 9B

GRIPPING DEVICE AND METHOD FOR PROTECTING THE HOOF OF A HORSE FROM CONCUSSIVE FORCES

CROSS-REFERENCE TO RELATED APPLICATIONS

This Application is a continuation in part of patent application Ser. No. 10/052,938, filed Jan. 23, 2002, now U.S. Pat. No. 6,619,403 B2, the disclosure of which is hereby incorporated by reference.

BACKGROUND OF THE INVENTION

1. Field of the Invention

This invention relates to the art and science of horseshoeing, and more particularly, to apparatus that is directly secured to the hoof of a horse, or sandwiched between a conventional horseshoe and the hoof of a horse, for improving traction, spreading shock and concussive forces evenly over the horse's hoof, and/or protecting and/or permitting access to the wound of a horse's hoof. Even more particularly, an apparatus of the invention includes an elastomeric pad, a removable hospital plate, a supportive pump action circulation stimulating pad, traction elements, such as a front toe calk, and/or hoof engagement clips, which provide a positive stop for the elastomeric pad against the hoof and keep the elastomeric pad from sliding relative to the hoof when pressure is applied from forces created by the horse's movement.

2. Description of the Prior Art

Horseshoes come in a variety of sizes and shapes depending on the type of horse and activity for which the horse is to be engaged. Generally horseshoes are U-shaped and conform to the circumference of the hoof with two branches emanating from the toe area and projecting beyond the heel. Typically, the horseshoe is nailed to the hoof. Every three to five weeks due to the growth of the horse's hoof, the shoe is removed and the hoof trimmed. The shoe can be reused or reset each time until it is worn out. Although iron or metal horseshoes offer protection to the horse's foot, they offer little or no absorption of shock and concussion when the horse moves, especially when carrying a rider. Furthermore, metal shoes wear smooth and provide little traction on many surfaces.

In recent years horseshoes of various plastics and elastomers have been tried. Although they increase the absorption of shock and concussion, they fail to offer proper protection to the horse's hoof because of their lack of stiffness, shapeability and durability. Typically, the better the particular material performs as a shock absorber, the worse its wear characteristics. Further, these shoes have typically wear smooth and as a result traction or grip is lost.

A suitable gripping device which improves the grip between the horse's hoof and the contacting surface and spreading shock over the hoof is disclosed in U.S. Pat. No. 5,636,695, issued Jun. 10, 1997 to Watson, Jr., et al, the specification of which is specifically incorporated herein by reference. While this gripping device is suitable, it has been found that further protection to the horse's hoof from concussive and shock forces would be desirable. Protecting a horse's hoof from physical shock and concussive forces is an important factor with respect to horse involved in racing and other competitive activities.

SUMMARY OF THE INVENTION

According to this invention, there is provided a gripping device for horses, which device improves the grip or traction between a horse's hoof and the contacting surface, spreads the shock of the hoof contacting the ground over the entire surface of the hoof, provides structure which engages the outer periphery of the horse's hoof to position the device relative to the hoof, and provides access to the bottom surface of the horse's hoof to provide medical treatment thereto.

In accordance with a first preferred embodiment of this invention there is provided a gripping device for use in conjunction with a generally U-shaped horseshoe, the gripping device being sandwiched between the bottom surface of the horse's hoof and the upper face of the horseshoe. The gripping device includes a generally planar elastomeric pad adapted to spread the shock evenly upon striking the contacting surface and distribute the pressure over the entire surface of the hoof, and a gripping element for improving the traction between a horse's hoof and the contacting surface. The pad has a top surface which faces toward and is secured to the horse's hoof, a bottom surface opposite the top surface, and an outer periphery having a shape that conforms, at least in part, to the curvilinear shape of the horseshoe.

The gripping element comprises a flat metal plate that is embedded interiorly of the elastomeric material and preformed to include a raised traction section, the plate being generally T-shaped or X-shaped.

As to the T-shaped gripping element, the head and body portions of the plate are symmetrically disposed relative to a central axis extending between the front and rear of the pad, the body portion being centered along the center axis and the head portion being somewhat curved relative to the body portion. Preferably, the distal end of the head and body portions terminate at the outer periphery of the pad. Similarly, the distal ends of the X-shaped plate terminate at the outer periphery of the pad and the center of the "X" is centered on the central axis.

In the T-shaped and X-shaped gripping plates, the raised traction section is at the center of the intersecting of the head and body portions, and projects, at least in part, above the bottom surface of the pad to improve traction. Preferably, the raised traction section is generally T-shaped or of other suitable curvilinear shape.

According to this preferred embodiment, the pad is formed to include an outer periphery of predetermined curvilinear shape that is substantially coextensive with and is bounded by the exterior wall of the horseshoe. That is, when sandwiched between the hoof and the horseshoe, the pad covers substantially all of the bottom surface of the horse's hoof.

In accordance with a second preferred embodiment of this invention, the pad is formed to include an outer periphery of predetermined curvilinear shape that enables the pad to fit within and be bounded by the interior U-shaped wall of the horseshoe, whereupon the pad, with its inlaid traction element, is secured to the bottom surface of the horse's hoof Advantageously, the gripping device disclosed herein protects the horse's foot and inhibits stone bruising.

The gripping device prevents irregular objects from penetrating the frog and sole of the hoof ensuring protection and enhancing hoof integrity.

In accordance with a third preferred embodiment of this invention, the gripping device is modified to include one or more clips for engaging the side of the horse's hoof. Each clip is integrally formed with the gripping plate, such that the T-shaped plate includes a single toe clip and the X-shaped plate includes a pair of side clips. As described hereinabove, the plate portions have distal ends that terminate at the outer periphery of the elastomeric pad. According to this preferred embodiment, the respective toe clip and side clips extend from the elastomeric material, at an acute angle to the plate, and into engagement with the side of a hoof. Preferably, the gripping device includes the traction section, as described hereinabove.

Desirably, the gripping device may be separately provided to the user and inventoried, if desired. Further, the gripping device and a complementary horseshoe, suitable for securement to a known horse breed and/or hoof type or need, may be sold in a kit form and inventoried by a user.

The traction portion in the center of the gripping device does not protrude past the contacting surface of the horseshoe. When the horseshoe penetrates the ground surface (e.g., 1/8 to 3/16 inch) the traction device comes into contact with the ground, reducing the chance of slipping. Desirably, the traction element can be altered by grinding it to the desired height.

The gripping device is desirably lightweight, provides support, and when worn as a preventative application in training and sporting events, will protect the horse's feet.

The traction section stimulates circulation. When the traction section fills with dirt it applies even force on the elastomeric material of the pad, transmitting equal force to the horse's frog, stimulating circulation and promoting heeling, while the inlaid metal plate and elastomeric material support and protect injured areas.

In accordance with a fourth preferred embodiment of this invention, there is provided apparatus for protecting the hoof a horse from concussive forces, the apparatus comprising:

a generally planar support pad that is formed of a resilient material and sandwichable between the horse's hoof and a horseshoe, said support pad having two cutout portions to provide access to frog portion of the horse's hoof when the pad is secured to the hoof, and a stiffening plate embedded, in part, in the elastomeric material, and including a raised generally Y-shaped traction element that projects away from the lower surface of the support pad, the traction element being disposed between the two cutout portions and positionable to overlie the frog and central portions of the horse's hoof when the pad is secured to the hoof, a hospital plate that is removably mountable to the lower surface of said support pad whereby to be in covering relation with the cutout portions, said hospital plate including a curvilinear edge which is complementary to and seats, in part, about the traction element and against the interior of the horseshoe, means for removably affixing the hospital plate to the support pad.

The support pad can be made with pre-cutout areas or as a full pad allowing the farrier to cut the pad inline with the adjacent wound in the sole of the hoof.

In accordance with a fifth preferred embodiment of this invention, there is provided a horseshoe for covering and protecting the bottom surface of a horse's hoof from shock and concussive forces when the horseshoe is attached thereto, the horseshoe comprising:

a planar flexure plate embedded into a body of a first elastomeric material, said flexure plate having a curvilinear outer periphery and an arcuate forward end portion, said elastomeric material forming an upper surface that is abuttable against the bottom surface of the hoof, a lower surface that engages the ground, and an outer periphery, the outer periphery of the flexure plate when embedded in the elastomer and the outer periphery of the horse's hoof being substantially the same, and at least one clip for engaging the horse's hoof when the horseshoe is attached to the bottom surface of the horse's hoof, said at least one clip extending upwardly from the outer periphery of said elastomeric material and backwardly towards the upper surface.

According to a first aspect of this fifth preferred embodiment, the clip is integrally formed with the elastomeric material used molded onto and about the flexure plate.

According to a second aspect of this fifth preferred embodiment, the horseshoe further includes a toe calk for providing traction to the horseshoe. The toe calk is disposed at the forward end portion of said flexure plate and projects upwardly from the lower surface thereof and away from the horse's hoof when the horseshoe is attached to the hoof. Preferably, the toe calk is generally arcuate, and includes a bottom end that is juxtaposed against the forward end portion of the flexure plate and embedded in the elastomeric material.

According to a third aspect of this fifth preferred embodiment, the flexure plate includes a pair of arcuate stiffening ribs and a raised curvilinear traction section, the arcuate stiffening ribs being dimensioned to project above said traction section. The toe calk is disposed in centered relation between the arcuate stiffening ribs, the stiffening ribs and the toe calk forming a generally continuous U-shaped wall.

According to a fourth aspect of this fifth preferred embodiment, there is provided a hospital plate of rigid material, and the flexure plate includes a pair of shaped openings to permit the horse's hoof to be accessed to tend to a wound thereto. The hospital plate is generally planar, curvilinear, and sized to cover the shaped openings. The outer periphery of the hospital plate conforms, at least in part, to the U-shaped wall formed by the calks.

According to a fifth aspect of this fifth preferred embodiment, the horseshoe further comprises a planar pad of elastomeric material, and the traction section defines a curvilinear chamber that extends between the upper and lower surfaces of the elastomeric material. The planar pad is comprised of a compressible elastomeric material and has a curvilinear outer periphery sized to conform to and frictionally fit within the curvilinear chamber, such that when dirt enters and fills the chamber, the pad provides a supportive pump action that transmits circulation stimulating forces to the frog.

In a manner described hereinabove, the horseshoe according to this fifth preferred embodiment may be sold as a kit, the kit comprising the horseshoe (including the flexure plate embedded into the elastomeric material, the traction elements formed with and molded onto the plate, and the integrally molded toe clips), the hospital plate, the planar pad, and securement fasteners. The toe calk and the arcuate stiffening ribs can be dimensioned in a manner desired buy the user. That is, depending on the horse and the shoe desired, the user could request that toe calk could have a specific configuration (e.g., extension and ground engaging profile).

For a more complete understanding of the present invention, reference is made to the following detailed description and accompanying drawings. In the drawings, like reference characters refer to like parts throughout the several views, in which:

BRIEF DESCRIPTION OF THE DRAWINGS

FIG. 1 is a plan view of a T-shaped traction element embedded into an elastomeric pad from which a gripping device according to the present invention is formed.

FIG. 2 is an elevation view, in section, of the gripping device taken along line 2—2 of FIG. 1.

FIGS. 3–6 show the steps in forming a gripping device according to this invention.

FIG. 7 shows the gripping device of FIG. 6 mounted to a horse's hoof.

FIG. 8 shows an alternate embodiment of a gripping device, according to this invention, mounted to a horse's hoof.

FIG. 9A is a plan view of the gripping device having an X-shaped traction element used in cooperation with a hospital plate.

FIG. 9B is a plan view of the hospital plate shown in FIG. 9A.

FIG. 9C is a side view of the hospital plate shown in FIG. 9A.

DETAILED DESCRIPTION OF A PREFERRED EMBODIMENT OF THE INVENTION

Figure 10:
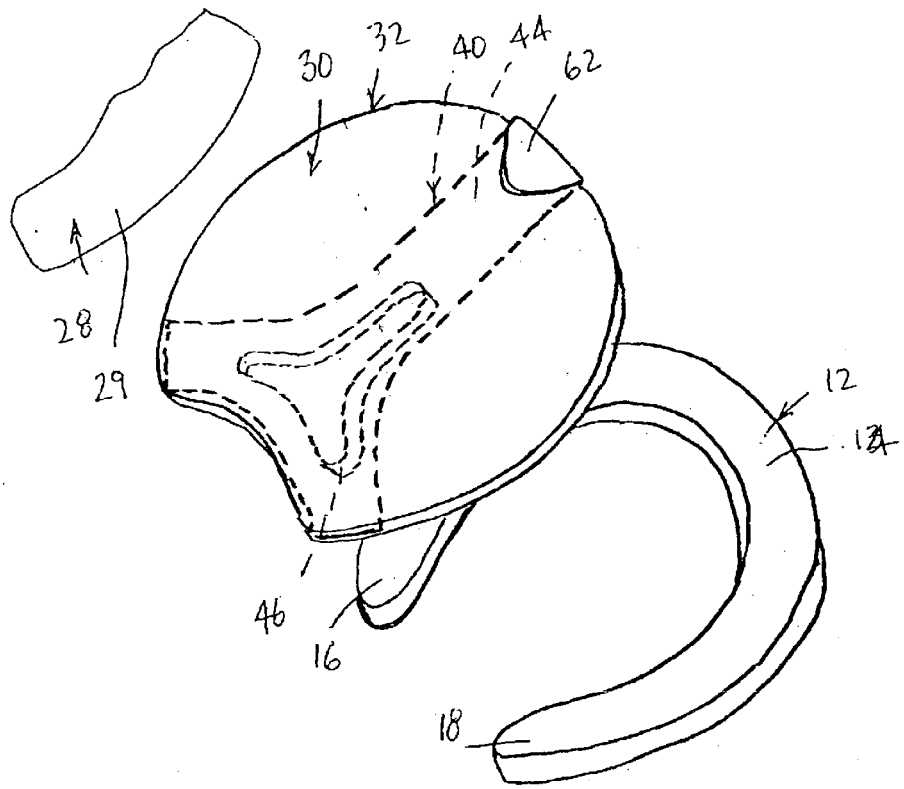
FIG. 10 is an exploded assembly view of a horseshoe and a gripping device positioned for assembly to the bottom surface of a horse's hoof, the T-shaped traction element of the gripping device being modified, according to this invention, to include a toe clip.

As noted hereinabove, the invention is directed to a gripping device for spreading shock evenly through the device and distributing pressure over the entire surface of a horse's hoof 28 and improving the grip or traction between the hoof 28 and the contacting surface, such as a racing track, resulting in better traction for the horse, especially on a wet or muddy track or surface.

With more particularity and as shown in FIGS. 1–8, the gripping device hereof is, generally, denoted at 10 and 100 and each is, preferably, used in combination with a horseshoe 12 and adapted to be secured to the bottom surface of the horse's hoof 28. As shown best in FIG. 8, the gripping device 10 has an outer periphery that is substantially coextensive with and bounded by the inner wall 24 of the horseshoe 12. As shown best in FIGS. 6 and 7, the gripping device 100 is interposed between the horseshoe 12 and the horse's hoof 28 and has an outer periphery that is substantially coextensive with and bounded by the outer wall 26 of the horseshoe.

Referring again to FIG. 8, the horseshoe 12 is generally U-shaped having a central arcuate toe portion 14, an arcuate right leg or branch portion 16 and an arcuate left leg or branch portion 18. The horseshoe 12 has a ground facing, substantially planar side 20, a top hoof wall or sole facing side 22, and a pair of U-shaped walls 24 and 26, the wall 24 facing inwardly and forming the interior of the horseshoe and the wall 26 facing outwardly and forming the exterior wall of the horseshoe. The horseshoe 12 may be made of any material suitable for horseshoes, such as iron, and is typically secured to the horse's hoof 28 by nails.

The gripping devices 10 and 100 each comprise an elastomeric pad 30 and a gripping element 32. The pad 30 of each device 10 and 100 is cut into shape, as needed, depending upon the shape of the horseshoe, from a formed pad 30', as will be described hereinbelow.

The pad 30 comprises a flat top surface 34 that faces toward the horse's hoof 28, a bottom surface 36 opposite the top surface, and an outer periphery 38. The outer periphery 38 of the gripping elements 10 and 100, respectively, approximates the shape of the horseshoe inner wall 24 and outer wall 26.

The pad 30 is comprised of a rigid yet flexible material, such as rubber, neoprene or other suitable elastomer, a polymer, high-grade polyurethane, or other durable stress resistant material. In a preferred embodiment the pad has a thickness of about 0.125 inches to 0.187 inches, a width of about 6.5 inches, and a length of about 6.75 to 7.25 inches. Depending on the physical activity the horse is involved in, the pad could be thinner or thicker, smaller or larger, thinner and smaller or thicker and larger—such as Western performance, to increase the resistance to impact forces on the horse's hoof.

The gripping or traction element 32 comprises a planar flat plate 40 that is embedded (i.e., inlaid) into the elastomeric material. Preferably, the plate 40 is either X- or T-shaped or Y-shaped, of a suitable metal, and comprises an arcuate portion 42, a rectangular portion 44, and a generally curvilinear raised portion or section 46 formed centrally of the plate portions 42 and 44. Preferably and for reasons that will be described hereinbelow, a plurality of apertures 49 are provided in the plate portions 42 and 44.

The raised section 46 comprises a continuous wall 47 and, generally, defines the outline of a "T". The raised section 46 defines a T-shaped opening 48 that cooperates to bond to the pad material. Preferably, the raised section 46 is integral with the plate 40 and projects upwardly therefrom to provide traction.

Additional details of the gripping element 32 are discussed in the above-mentioned U.S. Pat. No. 5,636,695 and will not be discussed further.

Referring to FIGS. 1–6, in a method of manufacture of the gripping element 100, the preformed metal plate 40 is positioned in a suitable mold (not shown). An amount of rubber, neoprene or suitable polymeric or elastomeric material is poured or otherwise introduced into the mold and about the plate 40 whereby to embed the arcuate and rectangular portions 42 and 44 of the plate 40 in the material and at a location between the top and bottom surfaces 34 and 36.

As shown in FIGS. 1 and 2, the elastomeric material forms a pad 30'.

As shown in FIG. 2, the raised section 46 is partially embedded in the elastomeric material and projects upwardly from the bottom surface 36. Additionally, a portion of the material may be introduced into the T-shaped opening 48 of the raised portion 46 to help bond or secure the plate 40 to the material.

Although the above discussion contemplates that the gripping element 40 is preformed and supplied separately, it is to be understood that the raised section 46 can be integrally molded as part of the pad 30'. Additionally, although the raised section 46 is illustrated as being generally T-shaped, it is to be understood that the shape could be other (e.g., X-shaped or Y-shaped). Further, an array of ribs or cleat like members could be provided.

Depending on the application, the plate portions 42 and 44 could be stamped and formed from a metal plate to provide any desired shape and gripping element 46 of desired height, or otherwise formed by methods known by those in the metal forming art.

Further, if desired, rivets 50 through the inlaid metal plate 40 can be provided for additional strength. In this regard, an array of apertures are provided in the metal plate portions 42 and 44. During formation of the pad, the elastomeric material will fill the apertures and form a rivet-like interconnection therebetween. The rivets will result in the metal plate 40 being further intersecured within and to the elastomer.

In the method, referring now to FIG. 3, the pad 30' is positioned such that the heels of the horseshoe are resting above the inlaid metal plate 40. The heels may be positioned up to about one-half inch past the plate 40, or as required. A line is traced on the elastomeric material about the outside of the horseshoe.

In FIG. 4, the trace outline on the pad 30' is cut, removing the material "A", being careful to cut around the inlaid metal plate. The pad material "B" is then removed from the top and the bottom of the metal plate.

In FIG. 5, excess metal 42' and 44' is cut-off from the plate portions 42 and 44, such as with a belt sander or hand grinder, or the like, and any metal remaining ground down to remove any sharp edges. This provides the gripping element 100.

Turning to FIGS. 6 and 7, the gripping device 100 is shown mounted to the bottom surface of the horse's hoof.

The pad 30 of the gripping device 100 may be attached to the horse's hoof by any suitable means, such as by nails. Preferably, and as shown, the pad 30 is configured to substantially overlie the frog of the horse's foot. The pad 30 with its inlaid plate 40 and traction element 46 provides stimulation of the vascular system and hence is an aid to blood circulation, when used in conjunction with hoof impression material.

In the method of manufacturing the gripping device 10, the horseshoe 12 is positioned onto the pad 30' and a line, similar to that shown in FIG. 3, is traced about the inside of the horseshoe, the excess pad material is removed, and any exposed end portion of the metal plate ground so as to be free of sharp edges. This provides the gripping element 10 having the desired outer periphery.

Turning to FIG. 8, the gripping element 10 is shown therein as being positioned within or bounded by or traversing the spaces between the branches of the horseshoe 12 and secured to the horse's hoof. The apex 52, frog 54, and buttress 56 of the frog are shown relative to the horseshoe 12 and the gripping element 10.

The pad 30 of the gripping element 10 may be attached to the horse's hoof along its outer periphery by any suitable means, such as by nails or glue. Preferably, and as shown, the pad 30 is configured to substantially overlie the frog of the horse's foot for the same reasons stated regarding the gripping device 100.

Several distinct advantages are thus seen as being provided by the gripping device 10 and 100.

Desirably there is provided herein a device that aids traction protection and therapeutic shoeing applications.

The gripping device of the present invention improves traction between the horse's hoof and the ground and spreads the shock evenly and distributes pressure over the entire surface of the horse's hoof.

The arcuate portion 42 when positioned in relation to the heels of the horseshoe, offers frog support at the buttress of the frog in a manner similar to straight bar shoes. This is achieved by filling the void between the gripping device and the frog with the desired elastomeric support material.

The rectangular portion 44, which stems from the toe and up to the arcuate portion 42, offers support to the center area of the hoof like a traditional heart bar shoe. This feature when combined with the desired elastomeric support material supports the apex of the frog and the sole of the hoof.

The rectangular portion 44 offers support to the sole of the horse's hoof when the void area of the sole and the gripping device are filled with the desired elastomeric material.

Frog stimulation occurs via earth material packing into the open area 48 of traction portion 46, applying equal pressure against the elastomeric material which covers the hoof side of the gripping device and essentially the T-shaped opening of the gripping element. When the gripping element is positioned correctly to the buttress and apex of the frog, the gripping device design allows the elastomeric material to flex, distributing even frog pressure. Ultimately, stimulating circulation in the hoof promotes healing of a sore-footed horse.

The light weight and strength of the gripping device allows any style of shoe to be applied to an injured hoof, minimizing added weight to the hoof capsule. A traditional straight bar or heart bar shoe would add more weight to the hoof and hoof capsule. The traction device 46 positioned between the heels of the shoe offers traction and supporting qualities whereas therapeutic shoes are heavy and flat, which promote slippage.

Referring now to FIGS. 9A, 9B and 9C, there is depicted a further embodiment of the present invention. In accordance with this embodiment, the pad hereof is used conjointly with a hospital plate 56. By the term, "hospital plate" is meant a pad or plate which overlies an injured hoof and through which there is access to the wound of the horse.

The hospital plate 56 hereof is used with and is complementary to the pad 30. The plate 56 is formed from a hard elastomeric material or aluminum having a thickness, preferably, of about ⅛". The plate 56 can be made of a universal size or for an individual size. As shown in FIG. 9B, the plate is a substantially planar member having a curvilinear edge which is complementary to the interior of a horseshoe. The plate 56 has a plurality of apertures or thread holes 57 which are intended to or which cooperate and register with openings 55 formed in the portion 44. Threaded fasteners, such as screws (not shown) project through the registering apertures 57 and 55 to secure the plate to the pad.

The plate 56 includes a cutout portion 60, which is complementary to the traction portion 46 and encircled the traction portion, as shown.

In practicing this embodiment, and as shown in FIG. 9A, the elastomeric pad 30 is cut out or is provided with a plurality of cut out portions 58. By providing the cut out portion or portions 58, the injured portion of the hoof is free of the pad and, therefore, no touching occurs therebetween to thus prevent irritation thereto.

It is to be appreciated that the hospital plate is, essentially, insertible into the cut out areas.

By cutting out the material of the pad, this exposes the hoof sole surface thus allowing a farrier or veterinarian to gain access to an abscess, puncture, wound or the like, to apply the requisite medicine or treatment. The hospital plate 56 then overlies and covers the injury and is secured to the pad via the threaded fasteners.

FIGS. 10–13 illustrate additional embodiments of horseshoeing systems, each sandwiching an elastomeric pad between the horseshoe 12 and the bottom surface of the horse's hoof 28. Further and according to this invention, the "T" shaped and "X-shaped" traction or gripping plates, illustrated in FIGS. 1 and 9, are modified to include one or more clips that engage a portion of the front and/or or sides of the hoof and align the pad relative to the hoof. The clip(s) projects upwardly from the gripping plate, provides a positive stop for the pad against the hoof, and keeps the pad and horseshoe from sliding relative to the hoof when pressure is applied from forces created by the horse's movement. The elastomeric material has a coefficient of friction and is compressible in response to the horse placing its weight on the hoof.

Figure 11:
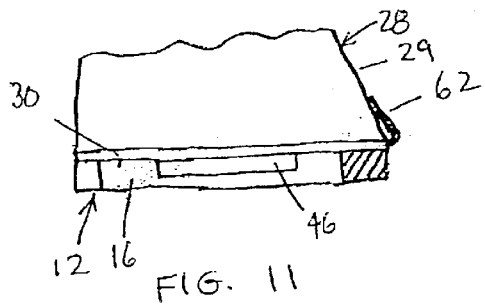
FIG. 11 is a side view, partially in section, of a horseshoe assembly including the gripping device of FIG. 10 sandwiched between the horseshoe and hoof.

Turning to FIGS. 10–11, the T-shaped gripping or traction plate 40 of the gripping element 32 (shown in FIGS. 1–8) is modified to include a toe clip 62.

In particular, the axially elongated rectangular plate portion 44 is adapted to be aligned with the central bight 14 of the U-shaped horseshoe 12 and dimensioned to include an axial end portion that extends outwardly from the outer periphery of the pad 30 and away from the elastomeric material. This axial end portion is bent upwardly from the plate 40 in a direction opposite to that of the traction device 46, backwardly, and downwardly towards the plane of the plate portion 44, whereby to be at an acute angle to the plate 40 (and upper surface of the elastomeric material) and form the toe clip 62. The toe clip 62 is of suitable lateral width and axial extension to align the pad 30 with the hoof 28 and juxtapose the toe clip 62 with the hoof sidewall 29. According to this embodiment, toe clip is centered with the forward end of the hoof sidewall. Preferably, the toe clip 62 is curved to remove sharp edges that might otherwise cut into the hoof.

Figure 13:
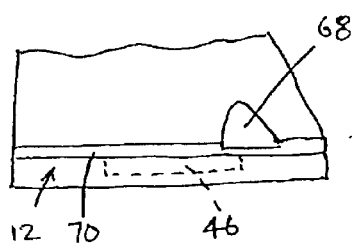
FIG. 13 is a side view of a horseshoe assembly including the gripping device of FIG. 12 sandwiched between a horseshoe and the bottom surface of a horse's hoof.
Figure 12:
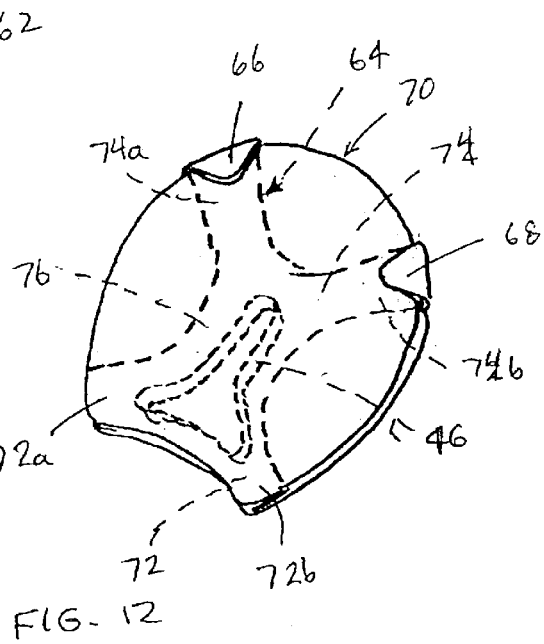
FIG. 12 is perspective view of a gripping device having an X-shaped traction element, the traction element being modified, according to this invention, to include a pair of side clips.

Turning to FIGS. 12–13, the X-shaped gripping or traction plate 64 (such as illustrated in FIG. 9) is modified to include two side clips 66 and 68.

The traction plate 64 comprises a planar sheet of metal that is embedded into a body of elastomeric material to form a thin planar pad 70 that is sandwiched between the bottom surface of the hoof and the top surface of the horseshoe. The traction plate 64 includes a pair of shaped, generally arcuate, plate portions 72 and 74, and a central rectangular plate portion 76, the plate portion 76 including the T-shaped traction section 46.

The arcuate plate portion 72 is centrally connected to one end portion of the rectangular plate portion 76, the connection dividing the plate portion 72 into first and second legs or wings 72a and 72b. The legs or wings 72a and 72b are generally of equal length, curve outwardly and away from the rectangular plate portion 76, are completely embedded in the elastomeric material, and terminate in ends that are coextensive with the outer periphery of the pad 70 and do not protrude outwardly of the pad.

The arcuate plate portion 74 is centrally connected to an opposite end portion of the rectangular plate portion 76, the connection dividing the plate portion 74 into first and second legs or wings 74a and 74b. The legs or wings 74a and 74b are generally of equal length, and curve outwardly and away from the rectangular plate portion 76.

According to this aspect of the invention, each leg 74a and 74b is embedded, at least in part, in the elastomeric material, but dimensioned to include a respective axial end portion 66 and 68 that extends outwardly from the outer periphery of the pad 70 and from the elastomeric material. These axial end portions 66 and 68 of the legs 74a and 74b form side clips for engaging the horse's hoof. The side clips 66 and 68 are bent upwardly from the traction plate 64 in a direction opposite to that of the T-shaped traction device 46, backwardly, and downwardly towards the plane of the respective wing, whereby to be at an acute angle to the traction plate 64 and the upper surface of the elastomeric material.

Each toe clip 66 and 68 is of suitable lateral width and axial extension to engage and align the pad 70 with the horse's hoof. Preferably, the toe clips are curved to remove sharp edges that might otherwise cut into the hoof.

The horseshoe 12 is generally symmetrical relative to a central geometric axis that passes through the central bight 12 thereof and the central rectangular plate portion 76 is adapted to be disposed along this axis and be aligned with the central bight. The arcuate plate portion 74 positions the respective ends 74a and 74b at peripheral locations of the elastomeric pad that are symmetrically angularly offset to the central bight of the horseshoe to engage and provide two stops around the side wall of the hoof.

The toe clip 62 (on the Y-shaped plate) and the side clips 66 and 68 (on the X-shaped plate) are integrally formed with their respective plates 40 and 64. Additionally, although the plates 40 and 64 are shown as being "T" or "X" shaped, with the plate portions being the locators of the toe clips relative to the hoof, the plates and plate portions thereof could be shaped otherwise.

Although the pads herein are provided with one or two toe clips, the number and arrangement of the clip(s) relative to the hoof could be other, depending on the needs of the situation. For example, alignment, angular relation relative to the hoof (or when juxtaposed above and about the horseshoe), gripping and providing stop benefits could dictate an arrangement other than that shown.

Additionally, although the elastomeric pad is shown as being generally flat and planar (i.e., has generally parallel upper and lower faces), in some situations to adjust the balance and/or gait of the horse, the pad could be wedge shaped (i.e., the upper and lower faces could be at an acute angle to one another). The faces could be angled laterally of the hoof or from front to rear, depending on the result desired.

Desirably, a horseshoe and pad according to this invention may be sold as a kit for a known horse or application. Further, the user may inventory these pads on location.

Figures 14, 16:
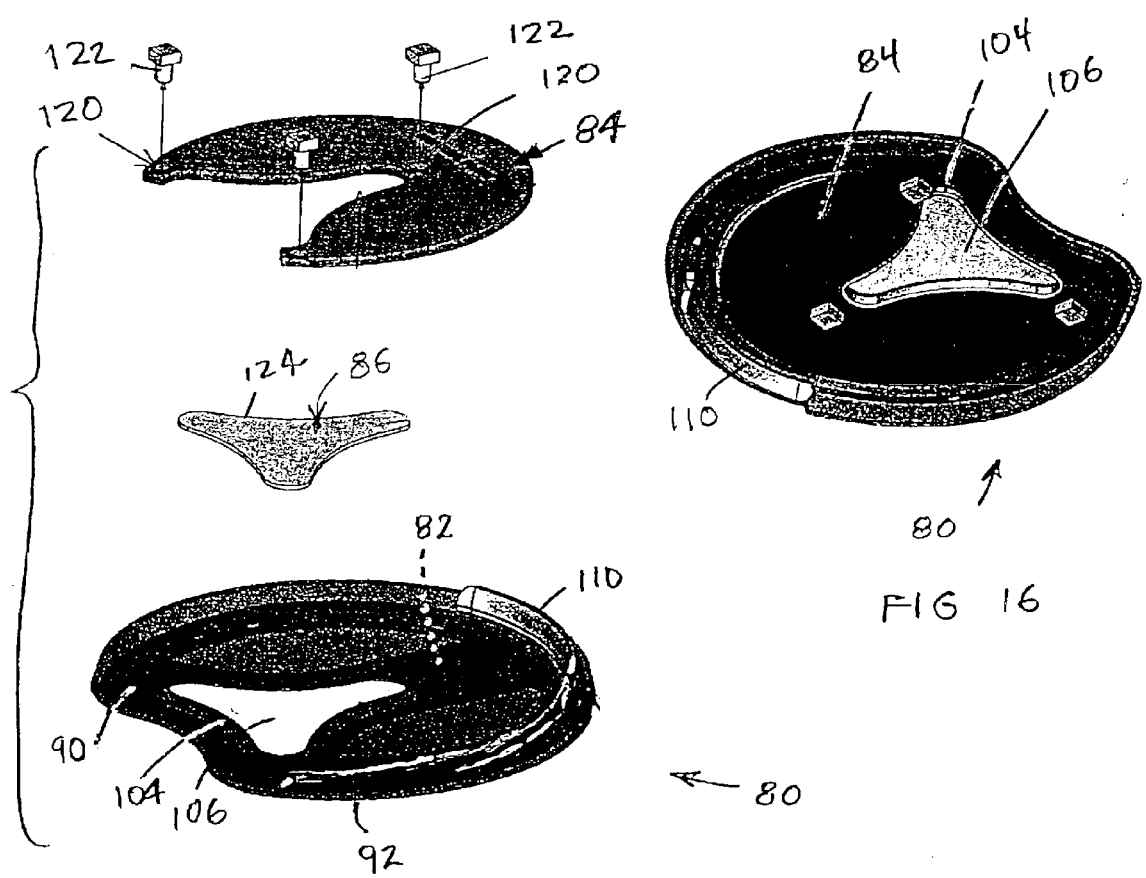
FIG. 14 is an exploded assembly view, looking at the ground engaging side of a horseshoe, and components therefor, that is attached to the bottom surface of a horse's hoof.
FIG. 16 is a perspective view of the horseshoe of showing a hospital plate and an elastomeric circulation stimulating pad fitted to the horseshoe.
Figure 15:
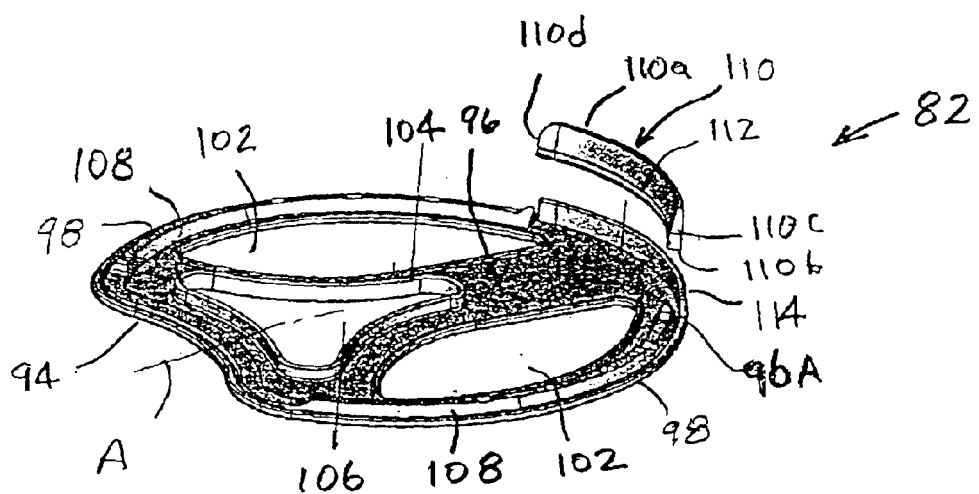
FIG. 15 is a perspective view of a flexure plate and a toe calk that is embedded into elastomeric material and forming part of the horseshoe illustrated in FIG. 14.

FIGS. 14–16 illustrate a horseshoe for covering and protecting the bottom surface of a horse's hoof from shock and concussive forces when the horseshoe is attached thereto. The horseshoe, generally indicated by the number 80, comprises a planar flexure plate 82 that is embedded into a body of an elastomeric material, a hospital plate 84 of rigid material, and a planar force transmitting cushioning pad 86.

The elastomeric material forms an upper surface 88 that is abuttable against the bottom surface of the hoof (See FIGS. 7 and 8), a lower surface 90 that engages the ground, and an outer periphery 92. The outer periphery 92 of the horseshoe 80 is defined by the flexure plate 82, as increased by the thickness of elastomer molded about the flexure plate. Generally, the outer periphery of the horse's hoof is substantially the same as the outer periphery 92 of the horseshoe 80.

Preferably, the elastomeric material is rubber, neoprene, a polymeric material such as polyurethane, polyethylene, or ABS.

In the pad 30 described hereinabove, the T-shaped plate 40 (with T-shaped traction section 46) is embedded into an elastomeric material that is soft and flexible, enabling the traction section and opening 48 thereof to move and flex (i.e., "pump") to provide circulation stimulating forces to the frog portion of the horse's hoof. However, as contemplated in horseshoe 80, the flexure plate 82 may be embedded into a harder elastomer (i.e., one that has reduced flexure at the traction section). Thus the separate cushioning pad 86 is secured into the T-shaped opening 106 of the traction section 104. As described in more detail hereinbelow, the cushioning pad 86 is comprised of a soft flexible material.

The flexure plate 82 is generally flat and has a curvilinear outer periphery 94 that generally conforms to the shape of the outer periphery of the horse's hoof. Preferably, the flexure plate 82 is integrally formed of a substantially rigid material to include central and peripheral sections 96 and 98 that are symmetrically disposed relative to a central axis "A" through the plate, and a forward end portion 96A. The central section 96 is generally T-shaped, adapted to overlie the frog portion of the horse's hoof, and is interconnected with the peripheral sections 98 whereby to form a pair of shaped openings 102 in the flexure plate 82.

Figure 15A:
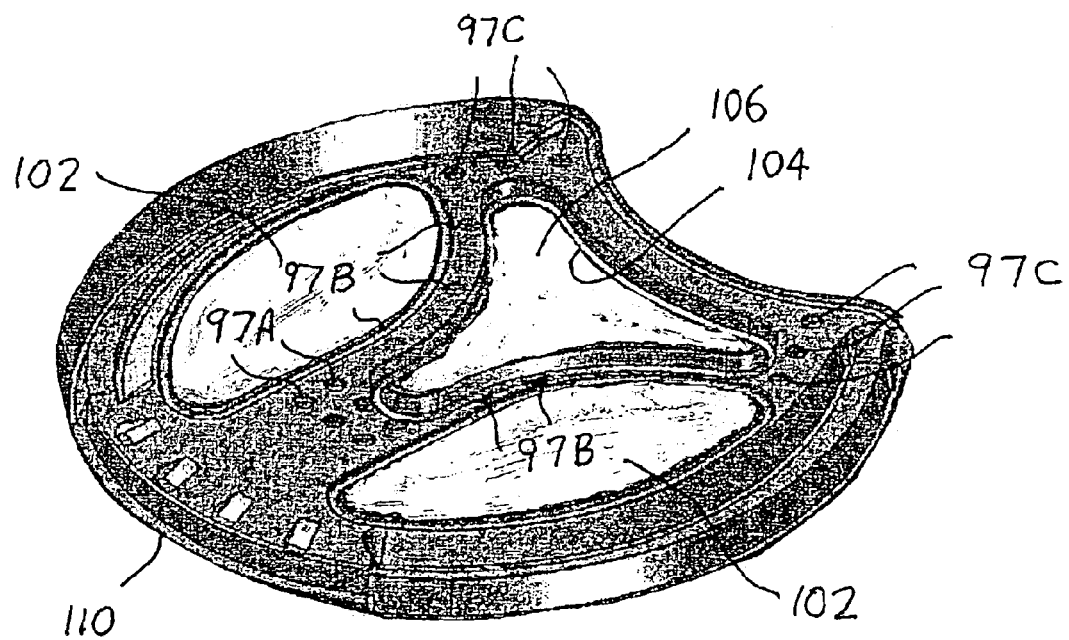
FIG. 15A is a perspective view of an alternate embodiment of the flexure plate of FIG. 15 viewed from the ground engaging side of the horseshoe and showing a plurality of apertures for interlocking with the elastomeric material.

As shown in FIG. 15A, the flexure plate 82 may include an array of apertures provided in the central section 96 and about the outer periphery of the traction section 104. As shown in the drawing two rows of three apertures 97A are provided forwardly of the traction section 104, two rows of apertures 97B are provided, one row extending along each side of the traction section, and two rows of three apertures 97C are provided, one row at each end of the traction section 104. Advantageously, the apertures 97A, 97B and 97C receive and interlock with the elastomeric material, as described hereinabove. Desirably, the above-described arrangement of apertures cooperate to prevent the elastomeric material from flexing in the sole area of the pad and confine the flex, i.e. the pumping action, to the frog area of the pad.

Preferably, the outer peripheral sections 98 are provided with respective rows of apertures 118 (see FIGS. 17 and 19), the apertures being positioned to receive nails for attaching the horseshoe to the bottom surface of the horse's hoof.

In a manner described hereinabove with respect to the T-shaped traction plate, the front end portion of the flexure plate may be provided with a toe clip, the clip angling upwardly and backwardly above the upper surface 88 of the horseshoe 80.

According to this invention, the flexure plate 82 is integrally formed of aluminum, steel, composites, or polymeric material such as a high-grade polyurethane, polyethylene, ABS, or suitable thermoplastic material.

The openings 102 are positioned to permit access to the bottom surface of the horses hoof to tend to a wound thereto. In this regard, during a molding operation wherein the flexure plate is embedded into the elastomer, the openings are filled with elastomeric material. In use, this elastomeric material may be removed, either in the field when needed, or prior to attachment of the horseshoe to the horse's hoof.

The horseshoe 80 is provided with structure to improve traction. In this regard, and in a manner described hereinabove, the flexure plate 82 includes a raised T-shaped traction section 104, the traction section forming a curvilinear chamber 106 that extends between the opposite surfaces 88 and 90 of the horseshoe and provides access to the bottom surface of the horse's hoof.

Further, the flexure plate 82 includes a pair of arcuate stiffening ribs 108, each stiffening rib being integrally formed with and projecting upwardly from a respective peripheral section 98 of the flexure plate. The arcuate stiffening ribs 108 extend from the flexure plate in a direction away from the horse's hoof when the horseshoe is attached thereto. The arcuate stiffening ribs 108 are dimensioned to project above the traction section 104 but do not provide traction at all. The raised rib top plane surface is flush with the nail crease.

Additionally, an arcuate toe calk 110 is located at the forward end portion 96A of the flexure plate 82. The toe calk 110 is generally arcuate and includes a bottom end 110*b* that is juxtaposed against the forward end portion 96A of the flexure plate 82, a top end 110*a* that projects above the flexure plate 82, and a pair of spaced endwalls 110*c* and 110*d*. The toe calk 110 is centered between the arcuate stiffening ribs 108 and projects upwardly from the flexure plate 82 and away from the horse's hoof when the horseshoe 80 is attached thereto. Preferably, an annular groove 112 extends between the spaced endwalls 110*c* and 110*d* of the toe calk 110.

In a similar fashion, a heel block, jar calk or mud calk can be held in the heels of the show the same way as the toe calk.

Further, a raised arcuate end wall section 114 is integrally formed with and projects upwardly from the forward end portion 96A of the flexure plate 82. The arcuate endwall section 114 is forward of the arcuate toe calk 110 and forms an annular space therebetween. The bottom end portion and the annular groove 112 in the toe calk 110 and the annular space between the endwall section 114 and the toe calk 110 are embedded and/or filled with elastomeric material to enhance gripping securement between the toe calk and the horseshoe.

The horseshoe 80 is formed, first by forming the flexure plate 82, such as by injection molding, and second, by embedding the flexure plate 82 and toe calk 110 into a body of elastomer. When molded, the flexure plate 82 includes the raised traction section 104, the arcuate walls 108 and 114 and the openings 102 and 106. Preferably, the forward end portion 96A of the flexure plate 82 is configured such that the raised arcuate walls 108 and 114 lock the toe calk 110 into position for being embedded, at least in part, into the elastomer. The flexure plate 82 and toe calk 110 are positioned into a mold cavity and the elastomer is injection molded thereabout, covering the openings 102 and leaving the T-shaped opening 106 free of elastomer 82 to receive the cushion pad 86. In some applications, the openings 102 may be left free of elastomer (i.e., open).

The hospital plate 84 is comprised of rigid material, generally planar, curvilinear, and sized to cover the shaped openings 102. The outer periphery of the hospital plate conforms, at least in part, to a curvilinear, generally U-shaped, inner periphery formed by the toe calk 110 and the arcuate stiffening ribs 108. The inner periphery of the hospital plate 84 conforms, at least in part, to the outer periphery of the T-shaped traction section 104 whereby to fit snugly thereabout.

Preferably, the hospital plate 84 is comprised of a high-grade polyurethane or aluminum.

To removably connect the hospital plate 84 to the horseshoe 80, the hospital plate 84 is provided with three apertures 120, and the horseshoe 80 is provided—with three threaded bores (not shown), each bore being alignable with a respective aperture 120. Three threaded fasteners 122 are provided to secure the hospital plate to the horseshoe. The fasteners 122 are positioned in respective apertures 120 and threadably engaged with a threaded bore aligned therewith.

Preferably, the elastomeric material into which the flexure plate 82 is embedded and used to make the cushioning pad 86, which covers the chamber 106, and shown and described in conjunction with FIG. 14, may be the same.

The cushioning pad 86 is generally planar and has a curvilinear outer periphery 124 sized to conform to and frictionally fit within the curvilinear chamber 106 of the traction section 104. In operation, dirt enters and fills the chamber and movement of the hoof transmits circulation-stimulating forces from the cushioning pad to the frog.

Preferably, the cushioning pad 86 is comprised of a relatively soft, flexible, polyurethane or other polymeric foam.

FIGS. 17–18 and 19–20 illustrate a horseshoe for covering and protecting the bottom surface of a horse's hoof from shock and concussive forces when the horseshoe is attached thereto. The horseshoe is as described hereinabove in connection with FIGS. 14–15, but differs in that the clip for engaging the outer periphery of the horse's hoof is integrally molded and formed with the elastomeric material of the pad molded about the flexure plate.

Figure 17:
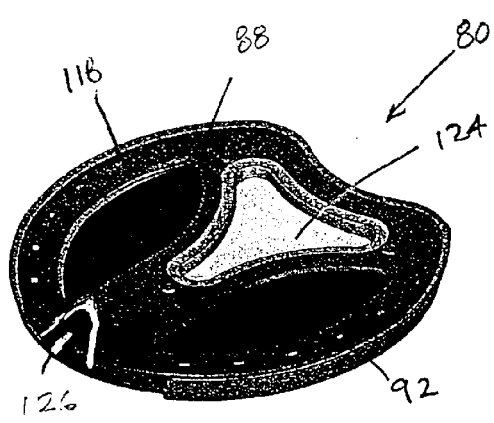
FIGS. 17 and 18 are, respectively, a perspective view of the hoof engaging side and a side elevation view (in section) of the horseshoe illustrated in FIGS. 14 and 15, and further including a front toe clip.
Figure 18:
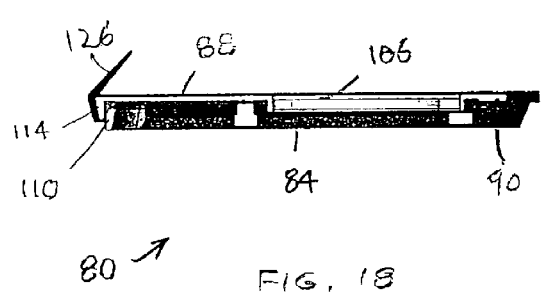

As shown in FIGS. 17–18, the horseshoe 80 is provided with a toe clip 126 for engaging the front center surface of the horse's hoof when the horseshoe is attached to the bottom surface of the horse's hoof. Preferably and according to this invention, the toe clip 126 is integrally formed with the elastomeric material and centered on the axis "A" at the forward end of the horseshoe. The clip 126 extends upwardly from the outer periphery of the elastomeric material and backwardly towards the upper surface 88. That is, the toe clip 126 is disposed at an acute angle to the upper surface 88 of the elastomer to form a limit or stop engagement with the front outer center of the hoof.

Figure 19:
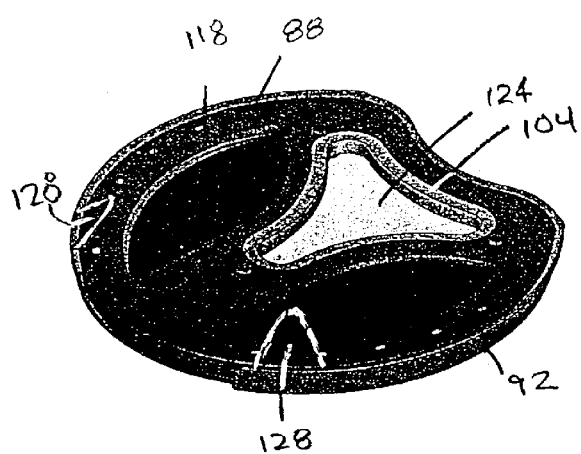
FIGS. 19 and 20 are, respectively, a perspective view of the hoof engaging side and a side elevation view (in section) of the horseshoe illustrated in FIGS. 14 and 15, and further including a pair of side clips.
Figure 20:
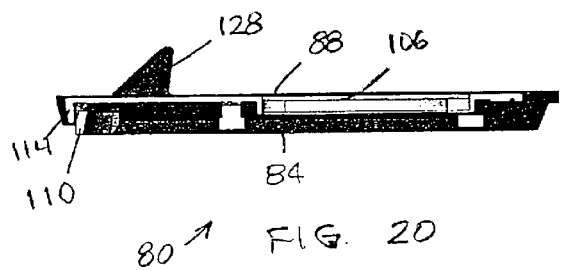

As shown in FIGS. 19–20, the horseshoe 80 is provided with two toe or side clips 128 for engaging the side surface of the horse's hoof when the horseshoe is attached to the bottom surface of the horse's hoof. Preferably and according to this invention, the toe clips 128 are integrally formed with the elastomeric material and centered at an angle to the center axis "A" at the forward end of the horseshoe. The clips 128 extend upwardly from the outer periphery of the elastomeric material and backwardly towards the upper surface 90. That is, the clips are disposed at an acute angle to the upper surface 88 of the elastomer to form a limit or stop engagement with the front outer sides of the hoof.

Preferably, as described hereinabove, the elastomeric material of the horseshoe shown in FIGS. 17–20 is rubber, neoprene, a polymeric material, such as polyurethane, polyethylene, or ABS.

In a manner described hereinabove, the horseshoe according to this preferred embodiment might be sold as a kit, the kit comprising the horseshoe (including the flexure plate embedded into the elastomeric material, the traction elements formed with and molded to the plate, and the integrally molded toe clips), the hospital plate, the planar pad, and the securement fasteners.

Although various embodiments of the invention have been disclosed for illustrative purposes, it is understood that variations and modifications can be made by one skilled in the art without departing from the spirit of the invention.

Having thus described the invention, what is claimed is:

1. A gripping device for attachment to the bottom surface of a horse's hoof to spread the shock evenly upon the hoof engaging a contacting surface and taking pressure off the wall of the hoof, the device comprising:

a generally planar shock absorbing pad of elastomeric material, the pad having an outer periphery conforming to the outer periphery of the horse's hoof and an upper surface adapted to face towards and cover substantially all of the bottom surface of the hoof, and a gripping member for improving the grip between a horse's hoof and the contacting surface, the gripping member being integrally formed and including a generally flat plate, a raised traction element for contacting the ground, and at least one raised clip for engaging the front outer periphery of the horse's hoof, the plate being embedded in the pad of elastomeric material, the traction element being positioned centrally of the pad whereby to overlie the frog of the horse's hoof and extending upwardly and outwardly from the elastomer in a direction away from the upper surface, and the clip extending upwardly and outwardly from the outer periphery of the pad and in a direction opposite to the traction element.

2. The gripping device as claimed in claim 1, further wherein the gripping member is T-shaped and formed by a head and a body section, the body section having a distal end disposed at the outer periphery of the pad and juxtaposed with the front of the horse's hoof, and the clip being formed at the distal end of the body section.

3. The gripping device as claimed in claim 1, further wherein the gripping member is formed by a pair of body sections into an X-shape, the X-shape having a pair of distal ends disposed at the outer periphery of the pad and juxtaposed with the front sides of the horse's hoof, and a clip being formed at each distal end.

4. The gripping device as claimed in claim 1, wherein the plate is comprised of a material capable of flexing, and the traction element will flex with the elastomeric pad and establish contact with the frog portion of the hoof to stimulate circulation.

5. The gripping device as claimed in claim 4, wherein the plate is a material selected from aluminum, steel, steel alloys, a polymer, plastic and related composites.

6. A shock-absorbing pad that is adapted to be sandwiched between the bottom surface of a horse's hoof and the mating face of a horseshoe when the horseshoe is attached to the bottom surface of said hoof, said pad comprising a body portion formed of an elastomeric material and having an outer peripheral shape that is coextensive with the outer periphery of the horse's hoof and an upper surface that covers the entire bottom surface of said hoof, and a generally planar stiffening plate embedded interiorly of said body portion, the upper surface of said elastomeric material when in use, being in direct contact with the bottom surface of said hoof, and said stiffening plate including both a raised traction element extending away from the bottom surface and a toe clip extending from the outer periphery of the pad and towards the bottom surface whereby the toe clip can engage the outer periphery of the hoof.

7. The shock absorbing pad as claimed in claim 6, wherein the pad is wedge shaped for effecting a change in either the balance of the hoof or gait of the horse.

8. A kit for horseshoeing, said kit comprising:
an elastomeric pad for attachment to the bottom surface of a hoof to be shod and protecting the hoof from concussive forces, and
a U-shaped horseshoe, the horseshoe having a lower surface for engaging the ground and an upper surface,
said pad having an upper face for engaging the bottom surface of said hoof, and a lower face for engaging the upper surface of the horseshoe, said pad including a raised traction section for providing traction with the ground and a toe clip for engaging the forward outer periphery of the horse's hoof, the traction section positioned centrally of the pad for overlying the frog portion of the horse's hoof and extending away from the lower face when the pad is attached to the bottom surface of the horse's hoof, and the clip extending from the outer periphery of said pad and in a direction away from the upper face of said pad.

9. The kit of claim 8, wherein the elastomeric pad is dimensioned to cover substantially all of the bottom surface of the hoof, and the traction element has first and second portions, respectively, embedded in and projecting upwardly from the elastomeric material.

10. The kit of claim 9, wherein the kit includes means for securing the horseshoe and the pad to the hoof with the pad sandwiched between the hoof and the horseshoe.

11. The kit of claim 10, wherein the pad includes a pair of toe clips, the clips extending from the elastomer for engagement with the forward peripheral side of a horse's hoof.

12. A kit for horseshoeing, said kit comprising:
a horseshoe, the horseshoe having an upper surface for attachment to the bottom surface of a hoof to be shod and a lower surface for engaging the ground, the horseshoe comprising an elastomeric pad for protecting the hoof from concussive forces, the pad having a curvilinear outer periphery conforming to the outer periphery of the horse's hoof and forming the upper and lower surfaces, a pair of openings extending between the upper and lower surfaces, a raised traction element embedded into the elastomeric pad and having an inner and outer periphery, the inner periphery of the traction element forming a central chamber that extends between the surfaces of the pad and permits access to the bottom surface of the hoof when the pad is attached to the hoof, and at least one toe clip extending from the outer periphery of the pad to engage the outer periphery of the hoof,
a hospital plate, the hospital plate being removably mountable to the lower surface and in covering relation to the openings, the hospital plate having a curvilinear periphery that conforms, at least in part, to the outer periphery of the traction element for snug fitment thereabout,
a second pad, the second pad being comprised of soft polymeric material having a curvilinear outer periphery that conforms to the inner periphery of the traction element for snug fitment of the second pad within the within the central chamber, and
at least one fastener for fastening the hospital plate to the horseshoe.

13. The kit of claim 12, wherein the at least one toe clip is integrally formed with the elastomeric material, the toe clip being adapted to be bent against the hoof and be disposed at an acute angle relative to the upper surface.

14. The kit of claim 13, wherein a single toe clip is integrally formed with the elastomeric material, the toe clip being disposed at the forward end of the elastomeric material for engaging the front center of the outer peripheral surface of the horse's hoof.

15. The kit of claim 13, wherein a pair of toe clips are integrally formed with the elastomeric material, the toe clips being disposed along the forward side of the elastomeric material for engaging the sides of the outer peripheral surface of the horse's hoof.

16. The kit of claim 13, wherein the elastomeric material and the hospital plate are each comprised of different materials having a respective resistance to flexure, the material of the hospital plate being more rigid and resistant to flexing than the elastomeric material.

17. The kit of claim 16, wherein the hospital plate is an aluminum plate, the elastomeric material is neoprene or a high-grade rubber, and the second pad is a polyfoam or softer polyurethane material.

18. A horseshoe assembly for attachment to the bottom surface of a horse's hoof, the assembly comprising:
a U-shaped horseshoe having an upper surface, a lower surface for contacting the ground, an exterior sidewall, and an interior sidewall,
a thin pad of a resilient elastomeric material, the pad being compressible in response to the horse placing its weight on the hoof and having an outer periphery that is complementary to the exterior sidewall of said horseshoe, an upper surface that abuts against the bottom surface of the horse's hoof, and a lower surface that abuts against the upper surface of said horseshoe,
a traction plate embedded within the elastomeric material, said traction plate including a raised traction element that extends downwardly from said traction plate and outwardly of the lower surface of said pad, said traction element extending downwardly from the lower surface of said pad by an amount not protruding beyond the lower surface of the horseshoe when the horseshoe and pad are attached to the hoof,
at least one clip for engagement with the outer peripheral surface of the horse's hoof, said clip extending from the outer periphery of said pad and bendable so as to extend perpendicularly upwardly relative to the upper surface of said pad, and
means for attaching said pad member and said horseshoe to the bottom surface of the horse's hoof with the pad being sandwiched between the bottom surface of the horse's hoof and the horseshoe.

19. The horseshoe assembly as claimed in claim 18, wherein said at least one clip is adapted to be centered with the front of the hoof and engaged with the outer surface of the hoof.

20. The horseshoe assembly as claimed in claim 19, wherein the traction plate is generally T-shaped with the body of the T-shape having a distal end disposed at the outer periphery of the pad, and said clip is formed with the body of said T-shape, the clip being connected to the distal end.

21. The horseshoe assembly as claimed in claim 19, wherein the outer periphery of the pad is generally curvilinear, symmetrical about a central axis, and wedge shaped for effecting a change in balance of the hoof.

22. The horseshoe assembly as claimed in claim 18, wherein at least two clips are provided, each clip being adapted to be positioned about opposite sides of the hoof and engage the outer surface of the hoof.

23. The horseshoe assembly as claimed in claim 22, wherein the traction plate is generally X-shaped with the body of the X-shape having a pair of distal ends disposed at the outer periphery of the pad, and said clips are formed with the body of the X-shape, each clip being connected to a respective of said distal ends.

24. The horseshoe assembly as claimed in claim 18, wherein said at least one clip is formed as a part of the traction plate and is adapted to angle upwardly and backwardly from outer periphery of said pad.

25. The horseshoe assembly as claimed in claim 18, wherein the pad is dimensioned to completely cover the entire bottom surface of the horse's hoof whereby to reduce concussion forces and alter hoof balance.

26. A horseshoe for covering and protecting the bottom surface of a horse's hoof from shock and concussive forces when the horseshoe is attached thereto, the horseshoe comprising:
  a planar flexure plate embedded into a body of a first elastomeric material, said flexure plate having a curvilinear outer periphery and an arcuate forward end portion, said elastomeric material forming an upper surface that is in direct contacting engagement against the bottom surface of the hoof when the pad is in use, a lower surface that engages the ground, and an outer periphery, the outer periphery defined by the elastomeric material covering the flexure plate being coextensive with substantially the entire outer periphery of the horse's hoof, and
  at least one clip for engaging the horse's hoof when the horseshoe is attached to the bottom surface of the horse's hoof, said at least one clip extending upwardly from the outer periphery of said elastomeric material for engagement with the outer periphery of the horse's hoof.

27. The horseshoe as claimed in claim 26, further including a toe calk for providing traction to the horseshoe, said toe calk being disposed at the forward end portion of said flexure plate and projecting upwardly from said lower surface and away from the horse's hoof when the horseshoe is attached thereto.

28. The horseshoe as claimed in claim 27, wherein said toe calk is generally arcuate and includes a bottom end that is juxtaposed against the forward end portion of the flexure plate, a top end that extends above the flexure plate projects away from the upper surface, and a pair of spaced endwalls, and an annular groove that extends between the endwalls, the bottom end portion and the annular groove of the toe calk being embedded in the elastomeric material.

29. The horseshoe as claimed in claim 28, wherein said flexure plate includes a pair of arcuate stiffening ribs for providing traction to the horseshoe, each arcuate stiffening rib projecting upwardly from the flexure plate and in a direction away from the horse's hoof when the horseshoe is attached thereto, and the toe calk being disposed in centered relation between the stiffening ribs.

30. The horseshoe as claimed in claim 29,
  wherein said toe calk and said arcuate stiffening ribs cooperate to form a curvilinear shape, and further including:
  a hospital plate of rigid material, said hospital plate being generally planar, curvilinear, and sized to cover the shaped openings, the outer periphery of the hospital plate conforming, at least in part, to the curvilinear shape formed by the toe calk and the arcuate stiffening ribs, and
  means for removably attaching the hospital plate to the horseshoe.

31. The horseshoe as claimed in claim 30, further wherein the flexure plate further comprises a raised curvilinear traction section, the traction section defining a curvilinear chamber that extends between the upper and lower surfaces of the of the elastomeric material, said arcuate stiffening ribs being dimensioned to project above said traction section.

32. The horseshoe as claimed in claim 31, further comprising a planar pad comprised of a second elastomeric material, said planar pad having a curvilinear outer periphery sized to conform to and frictionally fit within the curvilinear chamber, such that dirt entering and filling the chamber transmits circulation stimulating forces to the frog.

33. The horseshoe as claimed in claim 30, wherein said hospital plate is high-grade polyurethane or aluminum.

34. The horseshoe as claimed in claim 32, wherein the second elastomeric material of said planar pad is a polyurethane or polymer foam.

35. The horseshoe as claimed in claim 26, wherein
  said flexure plate includes central and peripheral sections that are symmetrically disposed relative to a central axis through the plate, the central section being adapted to overlie the frog portion of the horse's hoof and interconnected to the peripheral sections whereby to form a pair of shaped openings in the flexure plate, and
  said shaped openings are removably filled with elastomeric material, removal of the elastomer exposing the bottom surface of the hoof to permit the horse's hoof to be accessed to tend to a wound thereto.

36. The horseshoe as claimed in claim 26, wherein said flexure plate is integrally formed of a resilient material, wherein the material is aluminum, a high-grade polyurethane, polyethylene, or ABS.

37. The horseshoe as claimed in claim 26, wherein the elastomeric material is rubber, neoprene, a polymer, polyurethane, polyethylene, or ABS.

38. A horseshoe for attachment to a horse's hoof, comprising: a one-piece planar flexure plate embedded into a body of first elastomeric material, the body of elastomeric material forming an upper surface that engages the bottom of the horse's hoof and a lower surface, the flexure plate having an outer peripheral shape conforming to the shape of the hoof and including a forward end portion, a raised T-shaped wall section and a pair of raised arcuate peripheral wall sections, the T-shaped wall section overlying the frog of the horse's hoof when the horseshoe is attached thereto and forming a T-shaped chamber, and the raised wall T-shaped and arcuate sections forming traction surfaces, a pair of shaped openings that permit access to the frog of the horse's hoof, at least one clip for engagement against the horse's hoof, the clip angling upwardly and backwardly relative to the upper surface, a toe calk positioned at the forward end portion of the flexure plate, the toe calk having a bottom end portion embedded in the elastomeric material and a top end disposed above the upper surface, a hospital plate of rigid material disposed against the upper surface and removably connected to the flexure plate, the hospital plate having a curvilinear outer periphery conforming to the raised wall sections, the toe calk and the T-shaped wall section, the hospital plate covering the shaped openings, and a T-shaped pad of second elastomeric material removably disposed within said T-shaped chamber to provide support and transmit forces that stimulate the frog.

39. The horseshoe as claimed in claim 38, wherein the clip is integrally formed with the first elastomeric material, the clip being centered relative to the forward end portion of the flexure plate to engage the front surface of the hoof.

40. The horseshoe as claimed in claim 38, wherein two clips are integrally formed with the first elastomeric material, the two clips being positioned relative to the forward end portion of the flexure plate to engage the side surface of the hoof.

41. The horseshoe as claimed in claim 38, further wherein the toe calk and the raised peripheral wall sections form a generally continuous U-shaped wall section, and further including a raised arcuate end wall section, the arcuate end wall section being forward of the arcuate toe calk and projecting upwardly from the forward end portion of the flexure plate, the space between the lower end of the toe cam and raised arcuate and wall section being filled with the elastomeric material.

42. The horseshoe as claimed in claim 41, further wherein the lower end of the toe calk includes a recessed groove, the recessed groove being filled with the elastomeric material to further increase a gripping securement therewith.

43. Apparatus for the hoof a horse, the apparatus comprising:
   a generally planar support pad formed of a resilient material and having upper and lower surfaces, the upper surface being juxtaposable with the horse's hoof, an outer edge portion that is sandwichable between the horse's hoof and a horseshoe, and at least one central cutout portion to provide access to the frog portion of the horse's hoof,
   a curvilinear traction element connected to the support pad, said traction element being positioned centrally of the outer edge portion of the support pad and projecting away from the lower surface of the support pad, and
   a hospital plate that is removably mountable to the support pad to cover the central cutout portion, said hospital plate including a curvilinear edge which is complementary to and seats about the traction element and against the interior of the horseshoe.

44. Apparatus for protecting the hoof a horse from concussive forces, the apparatus comprising:
   a generally planar support pad that is formed of a resilient material, said support pad having an upper surface that is positionable against the bottom surface of the horse's hoof and a lower surface, an outer edge portion that is sandwichable between the horse's hoof and a horseshoe when mounted to the hoof, and two cutout portions to provide access to frog portion of the horse's hoof,
   a stiffening plate including at least two legs that are connected to the support pad and a Y-shaped traction element that projects away from the lower surface of the support pad, the traction element being positionable centrally of the outer edge portion and between the two cutout portions whereby to overlie the frog and central portions of the horse's hoof when said pad is positioned relative to the hoof,
   a hospital plate that is removably mountable to the lower surface of said support pad whereby to be in covering relation with the cutout portions, said hospital plate including a curvilinear edge which is complementary to and seats, in part, about the traction element and against the interior of the horseshoe, and
   means for removably affixing the hospital plate to the support pad.

45. The apparatus as claimed in claim 44, wherein said means for removably affixing comprises at least one threaded fastener, a threaded aperture in said stiffening plate, and an aperture in said hospital plate, said apertures being alignable with one another wherein to permit the fastener to pass therethrough and removably secure the hospital plate to said stiffening element.

* * * * *